(12) United States Patent
Zhou

(10) Patent No.: US 11,902,970 B2
(45) Date of Patent: Feb. 13, 2024

(54) INFORMATION TRANSMISSION METHOD AND APPARATUS, AND BASE STATION AND TERMINAL

(71) Applicant: BEIJING XIAOMI MOBILE SOFTWARE CO., LTD., Beijing (CN)

(72) Inventor: Juejia Zhou, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 422 days.

(21) Appl. No.: 17/290,976

(22) PCT Filed: Nov. 1, 2018

(86) PCT No.: PCT/CN2018/113498
§ 371 (c)(1),
(2) Date: May 3, 2021

(87) PCT Pub. No.: WO2020/087463
PCT Pub. Date: May 7, 2020

(65) Prior Publication Data
US 2022/0039130 A1 Feb. 3, 2022

(51) Int. Cl.
*H04W 72/1273* (2023.01)
*H04L 5/14* (2006.01)

(52) U.S. Cl.
CPC ....... *H04W 72/1273* (2013.01); *H04L 5/1469* (2013.01)

(58) Field of Classification Search
CPC ......... H04W 72/1273; H04W 72/0446; H04W 72/23; H04L 5/1469; H04L 5/0058; H04L 1/0003; H04L 1/0009; H04L 5/0053
See application file for complete search history.

(56) References Cited

U.S. PATENT DOCUMENTS

| 9,756,613 | B2 | 9/2017 | Nan et al. |
| 2014/0161095 | A1 | 6/2014 | Nan et al. |
| 2017/0302419 | A1 | 10/2017 | Liu et al. |
| 2019/0181998 | A1 | 6/2019 | Peng |

(Continued)

FOREIGN PATENT DOCUMENTS

| CN | 104838720 A | 8/2015 |
| CN | 105721376 A | 6/2016 |
| CN | 107733593 A | 2/2018 |
| CN | 108184268 A | 6/2018 |

(Continued)

OTHER PUBLICATIONS

On the Impact of Transient Period for Short Transmission Duration, Dec. 4-8, 2017, IEEE (Year: 2017).*

(Continued)

*Primary Examiner* — Ashley Shivers
(74) *Attorney, Agent, or Firm* — Arch & Lake LLP

(57) ABSTRACT

The present disclosure provides an information transmission method and apparatus, a base station and a terminal. The method includes: determining an impact factor of an on/off transient period on a unit transmission resource; determining transmission configuration information on a target unit transmission resource based on the impact factor; and using the target unit transmission resource for information transmission based on the transmission configuration information. The target unit transmission resource is the unit transmission resource where the on/off transient period is located.

19 Claims, 8 Drawing Sheets

(56) References Cited

U.S. PATENT DOCUMENTS

| | | | |
|---|---|---|---|
| 2019/0297572 A1* | 9/2019 | Rahman | H04W 72/1268 |
| 2021/0288853 A1* | 9/2021 | Sundberg | H04L 5/0048 |

FOREIGN PATENT DOCUMENTS

| | | |
|---|---|---|
| WO | 2017204595 A1 | 11/2017 |
| WO | 2018058398 A1 | 4/2018 |
| WO | 2018143856 A1 | 8/2018 |
| WO | 2018174802 A1 | 9/2018 |

OTHER PUBLICATIONS

Intellectual property India, Hearing Notice in Reference of Application No. 202147023413, dated Apr. 20, 2023, submitted with Partial Machine Translation, (2p).

State Intellectual Property Office of the People's Republic of China, Office Action and Search Report Issued in Application No. 201880002318X, dated May 31, 2023, submitted with Machine Translation, (13p).

International Search Report issued in the International Application No. PCT/CN2018/113498, dated Jul. 19, 2019, (4p).

European Search Report in the European Application No. 18939073.5, dated Nov. 9, 2021, (7p).

ISA State Intellectual Property Office of the People's Republic of China, Written Opinion of the International Searching Authority Issued in Application No. PCT/CN2018/113498, dated Jul. 19, 2019, WIPO, (9p).

Then First CNOA issued in Application No. 201880002318.X, dated Sep. 2, 2022, with Machine English Translation, (12p).

INOA issued in Application No. 202147023413, dated Feb. 23, 2022, with English Translation, (6p).

* cited by examiner ated examples

INFORMATION TRANSMISSION METHOD AND APPARATUS, AND BASE STATION AND TERMINAL

CROSS REFERENCE TO RELATED APPLICATION

This application is a national phase application based on International Application No. PCT/CN2018/113498, filed on Nov. 1, 2018, the entire content of which is incorporated herein by reference for all purposes.

TECHNICAL FIELD

The present disclosure relates to the field of communication technologies, and in particular, to information transmission methods and apparatuses, base stations and terminals.

BACKGROUND

In a mobile communication system under a time division duplexing (TDD) mode, for example a TDD-LTE system, a time domain uplink and downlink switching can be flexibly implemented through switching a radio frequency device, so that data reception and transmission are carried out at different slots in a same frequency channel (which is a carrier).

With the development of wireless communication technologies, a mobile communication system has gradually evolved to a 5G new radio (NR) system. Whether it is a 4G long term evolution (LTE) system or the 5G NR system, it takes time to turn on and turn off a radio frequency device of a user equipment (UE). The system uses a parameter as on/off time mask to represent the on/off transient period of the radio frequency device. In the LTE system, the on/off time mask has a fixed duration of 10 μs set by the system. Since sub-carrier spacing (SCS) in the LTE system is a fixed 15 kHz, according to a relationship between sub-carrier and a unit transmission resource, an impact of the on/off time mask on the unit transmission resource such as a symbol is fixed. In related art, if the unit transmission resource such as a symbol is affected by the on/off time mask, the system agrees on blanking the use of the unit transmission resource.

In the 5G NR system, the system indicates two communication frequency ranges: FR1 (450 MHz~6000 MHz) and FR2 (24250 MHz~52600 MHz). Values of the on/off time mask set for respective communication frequency ranges are different: a value for FR1 is set to 10 μs, and a value for FR2 is set to 5 μs. The system agrees that the sub-carrier spacing for each communication frequency range can include: 15 kHz, 30 kHz, 60 kHz, 120 kHz, etc. Therefore, in the 5G NR system, for different frequency ranges and unit transmission resources such as a symbol corresponding to different types of sub-carrier spacing, degrees of impact by the on/off time mask are different. If the strategy of blanking all affected unit transmission resources in related art is adopted, in an application scenario with frequent uplink and downlink switching, more transmission resources may inevitably be abandoned, which affects the data transmission rate.

SUMMARY

In order to overcome the problems in the related art, the embodiments of the present disclosure provide an information transmission method and apparatus, a base station and a terminal, which can effectively utilize transmission resources, and increase the data transmission rate in the application scenarios where uplink and downlink switching is relatively frequent.

According to a first aspect of the examples of the present disclosure, an information transmission method is provided. The method includes that a base station determines an impact factor of an on/off transient period on a unit transmission resource and determines transmission configuration information on a target unit transmission resource based on the impact factor. The target unit transmission resource is the unit transmission resource where the on/off transient period is located.

Further, the method includes that the base station uses the target unit transmission resource for information transmission based on the transmission configuration information.

According to a second aspect of the examples of the present disclosure, an information transmission method is provided. The method includes that a terminal receives transmission configuration information on a target unit transmission resource sent by a base station. The target unit transmission resource is a unit transmission resource affected by an on/off time mask in a time domain.

Further, the method includes that the terminal uses the target unit transmission resource for information transmission based on the transmission configuration information.

According to a third aspect of the examples of the present disclosure, there is provided a non-transitory computer-readable storage medium having computer instructions stored thereon, wherein the computer instructions, when executed by a processor, perform the method according to the first aspect.

According to a fourth aspect of the examples of the present disclosure, there is provided a non-transitory computer-readable storage medium having computer instructions stored thereon, wherein the computer instructions, when executed by a processor, perform the method according to the second aspect.

According to a fifth aspect of the examples of the present disclosure, there is provided a base station. The base station includes a processor and a memory for storing instructions executed by the processor. The processor is configured to determine an impact factor of an on/off transient period on a unit transmission resource and determine transmission configuration information on a target unit transmission resource based on the impact factor. The target unit transmission resource is the unit transmission resource where the on/off transient period is located.

Further, the processor is configured to use the target unit transmission resource for information transmission based on the transmission configuration information.

According to a sixth aspect of the examples of the present disclosure, there is provided a terminal. The terminal includes a processor and a memory for storing instructions executed by the processor. The processor is configured to receive transmission configuration information on a target unit transmission resource sent by a base station. The target unit transmission resource is a unit transmission resource affected by an on/off time mask in a time domain.

The processor is further configured to use the target unit transmission resource for information transmission based on the transmission configuration information.

It should be understood that the above general description and the following detailed description are only exemplary and explanatory and are not restrictive of the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

FIGS. 4-1 to 4-3 are application scenario diagrams for transmitting information according to an example of the present disclosure.

DETAILED DESCRIPTION OF THE EMBODIMENTS

Figure 1:
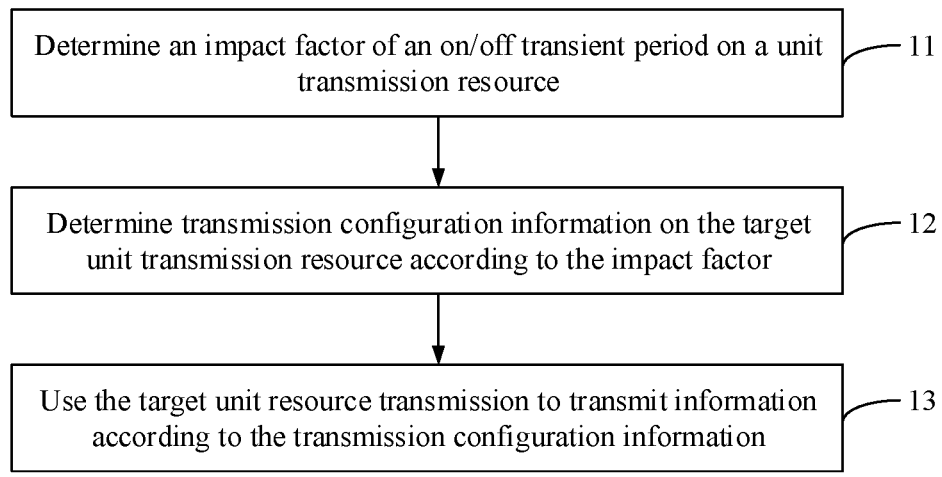
FIG. 1 is a flowchart illustrating an information transmission method according to an example of the present disclosure.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terms used in the present disclosure are for the purpose of describing particular examples only, and are not intended to limit the present disclosure. Terms determined by "a", "the" and "said" in their singular forms in the present disclosure and the appended claims are also intended to include plurality, unless clearly indicated otherwise in the context. It should also be understood that the term "and/or" as used herein is and includes any and all possible combinations of one or more of the associated listed items.

It is to be understood that, although terms "first," "second," "third," and the like may be used in the present disclosure to describe various information, such information should not be limited to these terms. These terms are only used to distinguish one category of information from another. For example, without departing from the scope of the present disclosure, first information may be referred as second information; and similarly, the second information may also be referred as the first information. Depending on the context, the word "if" as used herein may be interpreted as "when" or "upon" or "in response to determining".

The execution subject of the present disclosure includes a base station and a terminal (e.g., UE) in the 5G NR system, where the base station may be a base station with a large-scale antenna array, or a sub-base station with a large-scale antenna array, and so on. The UE may be a user terminal, a user node, a mobile terminal, a tablet computer, etc. In the specific implementation process, the base station and the terminal are independent of each other, and at the same time are connected to each other, so as to implement the technical solutions provided by the present disclosure together.

The information transmission method provided in the present disclosure can be applied to an application scenario where uplink and downlink switching is frequent in a 5G NR system. When the base station is scheduling a transmission resource, in two communication frequency ranges: FR1 (450 MHz~6000 MHz) and FR2 (24250 MHz~52600 MHz), unit transmission resources corresponding to different kinds of sub-carrier spacing can be scheduled. The available sub-carrier spacing for each communication frequency range may include: 15 kHz, 30 kHz, 60 kHz, 120 kHz, etc. In the present disclosure, a correspondence between communication frequency range information and preset on/off time mask value may be as shown in Table 1:

TABLE 1

| Frequency range designation | Frequency Range | On/off time mask value |
|---|---|---|
| FR1 | 450 MHz~6000 MHz | 10 µs |
| FR2 | 24250 MHz~52600 MHz | 5 µs |

Accordingly, the present disclosure provides an information transmission method, which is applicable to a base station. FIG. 1 is a flowchart illustrating an information transmission method according to an example, and the method may include the following steps.

At step 11, an impact factor of an on/off transient period on a unit transmission resource is determined.

In the present disclosure, before determining transmission configuration information for a target UE, the base station first determines a degree of impact of the on/off transient period of the target UE on the transmission resource, so as to determine a degree of availability for the affected unit transmission resource. The degree of availability includes: unavailability, resource utilization at different rates, etc. The transmission configuration is then performed according to the degree of availability for the unit transmission resource. The unit transmission resource in the present disclosure is a transmission resource corresponding to a unit time domain resource. The unit time domain resource in the present disclosure may be a sub-frame, a slot, a mini-slot, and a symbol, etc. In the present disclosure, the unit time domain resource takes a symbol as an example for exemplary illustration.

A timing for the base station to implement step 11 may be determined by the base station before the uplink and downlink transmission switching is involved, or may be determined by the base station in real time when the uplink and downlink transmission switching for the target UE is involved, which is not limited in this disclosure.

For example, when the base station transmits a latency-sensitive service, for example, an ultra reliable low latency communication (URLLC) service in a field such as Internet of vehicles that requires low latency, the base station can determine an impact factor in advance. When determining a target unit transmission resource involved in the uplink and downlink transmission switching, the impact factor is directly used to determine an available time domain range in the target unit transmission resource, so as to quickly configure the transmission and reduce the transmission latency.

For a latency-insensitive service such as a massive machine type communication (mMTC) service, the base station can determine the impact factor during the uplink and downlink transmission switching.

Regarding how to determine a corresponding impact factor for the target UE, in an embodiment of the present disclosure, the base station may receive the impact factor of the on/off transient period on the unit transmission resource determined by the target UE.

Figure 2:
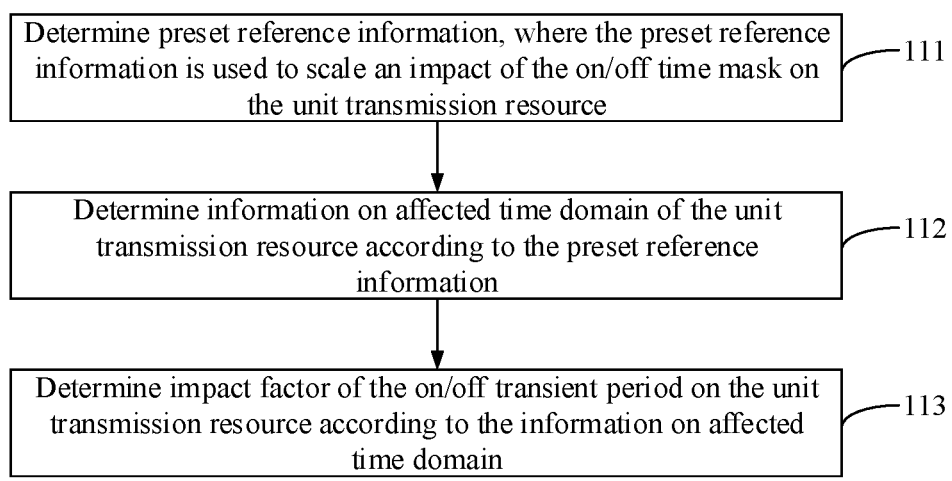
FIG. 2 is a flowchart illustrating another information transmission method according to an example of the present disclosure.

In another embodiment of the present disclosure, the base station may determine the impact factor of the on/off time mask on the unit transmission resource for the target UE based on obtained preset reference information. FIG. 2 is a flowchart illustrating another information transmission method according to an example, and step 11 may include the following step.

At step 111, preset reference information is determined, where the preset reference information is used to evaluate an impact of the on/off time mask on the unit transmission resource for information transmission.

In the present disclosure, the preset reference information includes reference information 2, and may also include: at least one of reference information 1 or reference information 3.

Reference information 1: an on/off transient period that the target UE is to spend during the uplink and downlink switching.

Assuming that the target UE is UE1, in the present disclosure, the base station can determine the on/off transient period of UE1 by at least two implementation as follows.

Implementation 1: the base station can determine the on/off transient period of UE1 according to a system agreement. For example, if a work frequency range of the radio frequency device of UE1 is within the FR1 frequency range, according to the system agreement, the base station can determine that the on/off transient period of UE1 is 10 μs.

Implementation 2: the base station may obtain on/off time mask realization capability information reported by UE1 to determine the on/off transient period.

Figure 3:
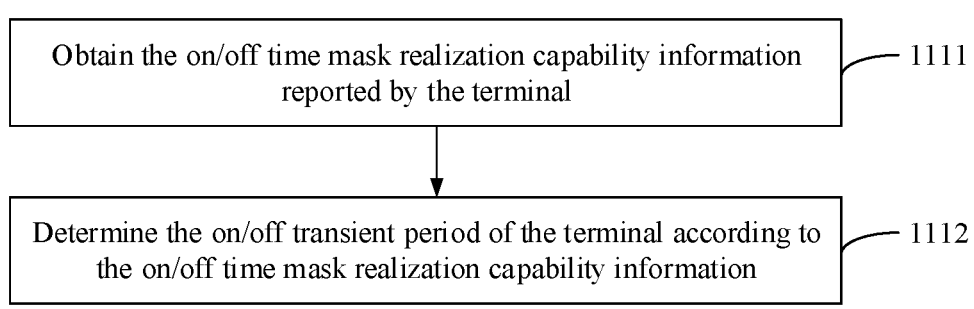
FIG. 3 is a flowchart illustrating another information transmission method according to an example of the present disclosure.

FIG. 3 is a flowchart illustrating another information transmission method according to an example, and step 111 may include the following steps.

At step 1111, the on/off time mask realization capability information reported by the terminal is obtained.

In the embodiments of the present disclosure, the base station may request UE1 to report its own radio frequency device realization capability for the on/off time mask, that is, the on/off time mask realization capability information, at a preset timing, such as when UE1 accesses a cell network covered by the base station. In other way, when UE1 accesses the cell network, UE1 actively reports the on/off time mask realization capability information of its own radio frequency device, e.g., radio frequency device, to the base station.

The on/off time mask realization capability information of UE1 may be a specific duration, for example, 1 μs, 5 μs, 10 μs, etc.; or, it can also be system-agreed preset index information representing the on/off transient period.

For example, assuming that the system determines that the on/off transient period can be implemented by the UE is 1 μs, 5 μs, 10 μs, corresponding index information is set. Assuming that the system agrees to use preset 2 bits in signaling to carry the preset index information, correspondences between on/off transient period and preset index information can be as shown in Table 2:

TABLE 2

| On/off transient period | Preset index information |
|---|---|
| 10 μs | 10 |
| 5 μs | 01 |
| 1 μs | 00 |

When UE1 reports its own on/off time mask realization capability information to the base station, the index information can be carried by the preset bits in preset uplink signaling, so as to inform the base station the on/off time mask realization capability information of the target UE.

In the present disclosure, the target UE can use upper layer signaling or physical layer signaling to send the on/off time mask realization capability information to the base station. The upper layer signaling may be radio resource control (RRC) signaling or medium access control (MAC) control element (CE) signaling.

In the embodiments of the present disclosure, by replacing the on/off transient period with a preset index value, an amount of resources occupied by the on/off time mask realization capability information can be reduced, thereby achieving the purpose of reducing signaling overhead.

At step 1112, the on/off transient period of the terminal is determined according to the on/off time mask realization capability information.

Correspondingly, if the on/off time mask realization capability information reported by UE1 includes an on/off transient period, the base station directly determines the transient period as the on/off transient period of UE1.

In another embodiment, if the on/off time mask realization capability information reported by UE1 includes the preset index information, the base station can query the correspondence between preset index information and on/off transient period according to the included index information as shown in Table 2 above, so as to determine the on/off transient period of UE1.

Reference information 2: sub-carrier spacing used by the base station and the target UE to transmit information within the work frequency range.

In a NR spectrum, each slot includes 14 symbols, and a number of slots in 1 millisecond (ms) is determined by the sub-carrier spacing (SCS). For example, when the SCS is 15 KHz, 1 slot is included in 1 ms; when the SCS is 30 KHz, 2 slots are included in 1 ms; when the SCS is 60 KHz, 4 slots are included in 1 ms; when the SCS is 120 KHz, 8 slots are included in 1 ms, and so on.

Correspondingly, a duration in the time domain of each symbol decreases as the SCS increases. For example, when the SCS is 15 KHz, the duration of one symbol is equal to a ratio of the duration of a slot to the number of symbols included in the slot, which is 1000 µs divided by 14, approximately equal to 71.x µs. Similarly, a correspondences between SCS and symbol duration can be determined as shown in Table 3:

TABLE 3

| Sub-carrier spacing (SCS) | Symbol duration (µs) |
|---|---|
| 15 KHz | 71.x |
| 30 KHz | 35.x |
| 60 KHz | 17.x |
| 120 KHz | 8.x |
| ... | ... |

As shown in Table 3, corresponding to different kinds of SCS, the on/off transient period of a target UE, such as 5 µs, is different in proportion to a symbol duration. As in the above example, when the SCS is 15 KHz, ratio R of the on/off transient period to a symbol duration is R=5/71.x; and when the SCS is 30 KHz, R=5/35.x; and so on.

Reference information 3: a distribution ratio of the on/off transient period of the UE in two adjacent unit transmission resources.

In an embodiment of the present disclosure, for an application scenario where the on/off transient period is distributed in two adjacent unit transmission resources, the system can agree on a distribution ratio of the on/off transient period in the two unit transmission resources, for example, 1:1, that is, the system can agree that the on/off transient period is the same in the time domain range of each of the two unit transmission resources. For example, for an on/off transient period of 10 µs, a duration in a symbol is 5 µs, and a duration in the next adjacent symbol is 5 µs.

In another embodiment of the present disclosure, the base station can also configure a distribution ratio for the target UE, such as 3:7. The system can also agree on multiple preset distribution ratios and configure corresponding index values. When the base station sends configuration information about the distribution ratios to the target UE, specific values of the ratios or preset index values corresponding to the values of the ratios can be loaded to specific signaling and sent to the target UE.

At step 112, information on an affected time domain of the unit transmission resource is determined according to the preset reference information.

In the present disclosure, the information on the affected time domain of the unit transmission resource refers to time domain information on an affected part in the time domain of a unit transmission resource, such as a symbol. The information on the affected time domain may include: position information and time domain duration of the affected time domain in the unit transmission resource.

Figures 1, 4:
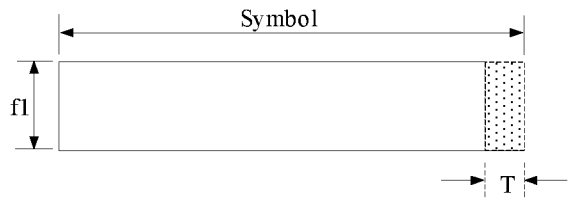
Figures 2, 4:
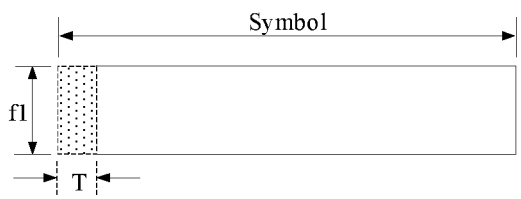
Figures 3, 4:
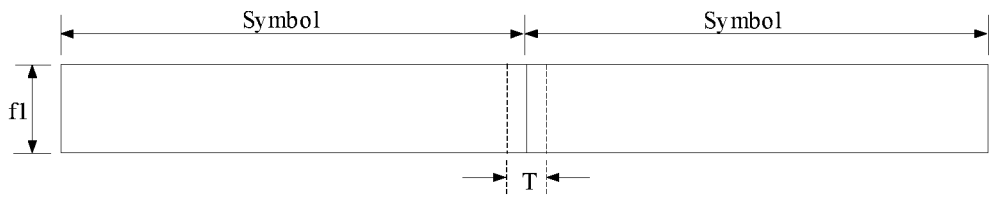

FIGS. 4-1 to 4-3 are three application scenario diagrams for transmitting information according to an example. FIG. 4-1 shows the application scenario where the on/off transient period T is located at the end of a unit transmission resource such as a symbol; FIG. 4-2 shows the application scenario where the on/off transient period T is located at the head of the symbol; and FIG. 4-3 shows the application scenario where the on/off transient period T is located at two adjacent symbols.

For example, assuming the base station determines that the on/off transient period T of UE1 is 10 µs, the base station and UE1 use the FR1 frequency range and 30 KHz sub-carrier spacing to transmit information. For UE1, information on the affected time domain of a symbol determined by the base station may include the following two conditions.

Condition 1, the on/off transient period affects one unit transmission resource, as shown in FIG. 4-1 and FIG. 4-2, an affected time domain duration of the symbol is 10 µs.

Condition 2, the on/off transient period affects the two adjacent unit transmission resources, as shown in FIG. 4-3. If the distribution ratio is 3:7, an affected time domain duration of the first symbol is 3 µs; and an affected time domain duration of the second symbol is 7 µs. The position information on the above two affected time domains can be the last 3 µs of the first symbol and the first 7 µs of the second symbol; or the last 7 µs of the first symbol, and the first 3 µs of the second symbol.

At step 113, the impact factor of the on/off transient period on the unit transmission resource is determined according to the information on the affected time domain.

In the present disclosure, the information on the affected time domain includes: a duration of the time domain affected by the on/off transient period in a unit transmission resource.

The impact factor can be represented by ratio R of a duration of the affected time domain to a duration of the unit transmission resource, that is, a ratio indicating the unit transmission resource affected by the on/off time mask.

For example, corresponding to the condition 1, the impact factor R=10/35.x≈28.57%.

Corresponding to the condition 2, if the on/off transient period occupies 3 µs of the first symbol and 7 µs of the second symbol, the impact factor of the first symbol affected by the on/off transient period is R1=3/35.x≈8.57%; and the impact factor of the second symbol affected by the on/off transient period is R2=7 µs/35.x µs≈20%.

At step 12, transmission configuration information on a target unit transmission resource is determined according to the impact factor, where the target unit transmission resource is a unit transmission resource where the on/off transient period is located.

In the present disclosure, before scheduling the uplink and downlink switching resource for transmitting data, the base station first performs transmission configuration on a unit transmission resource involved in the uplink and downlink transmission switching, which includes: configuring a transmission power, a modulation and coding scheme, and other information for the target UE.

In the present disclosure, the base station does not necessarily blank the unit transmission resource affected by the on/off transient period, but determines how to use the unit transmission resource according to a degree of impact. In the present disclosure, the unit transmission resource affected by the on/off transient period may be referred to as a target unit transmission resource.

In the present disclosure, the base station can use at least one of the following implementations to set the transmission configuration.

Configuration implementation 1: step 12 may include that a preset transmission parameter for a target unit transmission resource that meets an availability condition is configured according to a value of the preset transmission parameter.

The target unit transmission resource that meets the availability condition may be: a unit transmission resource whose impact ratio of the on/off transient period is less than or equal to a preset ratio threshold.

In an embodiment, the base station may use a rough configuration method to perform the transmission configuration on the target unit transmission resource. Assuming that the preset ratio threshold is 75%, in this embodiment, for a target unit transmission resource whose impact ratio is no more than 75%, the base station can set that a lowest-order modulation and coding scheme (MCS) is adopted, and/or, the base station can instruct the target UE to use the maximum transmission power when using the target unit transmission resource for data transmission. For example, the lowest-order MCS can be a binary phase shift keying (BPSK) modulation and coding scheme corresponding to the lowest data transmission rate.

In another embodiment of the present disclosure, the base station may also query a preset transmission configuration list of preset transmission parameters according to the impact ratio of the target unit transmission resource. Taking the configuration of MCS as an example, in this embodiment, the system may agree on a preset configuration list for the MCS associated with the target unit transmission resource. The preset configuration list includes: a correspondence between range of preset impact ratio and preset modulation and coding scheme, which is shown in Table 4.

TABLE 4

| Impact ratio | Modulation and coding scheme |
|---|---|
| 75%~100% | None |
| 50%~75% | BPSK |
| 25%~50% | QPSK |
| 5%~25% | 16 QAM |
| 0%~5% | Normal |

As shown in Table 4, when the impact ratio is less than 5%, it can be considered that the target unit transmission resource is less affected and can be equivalent to a normal unit transmission resource, and the corresponding modulation and coding scheme can be determined in the same way as a normal MCS determination method. As the impact ratio gradually increases, the system can agree to configure a gradually lower-level modulation and coding scheme for the target unit transmission resource. For example, corresponding to condition 1, that is R≈28.57%, it can be seen from Table 4 that the modulation and coding scheme configured by the base station for the target unit transmission resource can be quadrature phase shift keying (QPSK). When the impact ratio is greater than 75%, the base station does not configure the modulation and coding scheme for the target unit transmission resource, that is, blanking the target unit transmission resource for data transmission.

Configuration implementation 1 is mainly described in detail by taking the configuration of the MCS as an example. Similarly, this configuration implementation is also applicable for the base station to configure the transmission power of the target UE on the target unit transmission resource.

Configuration implementation 2: the base station can also perform fine configuration on the target unit transmission resource according to different values of the impact factor, that is, different degrees of impact of the on/off transient period on the target unit transmission resource.

Figure 5:
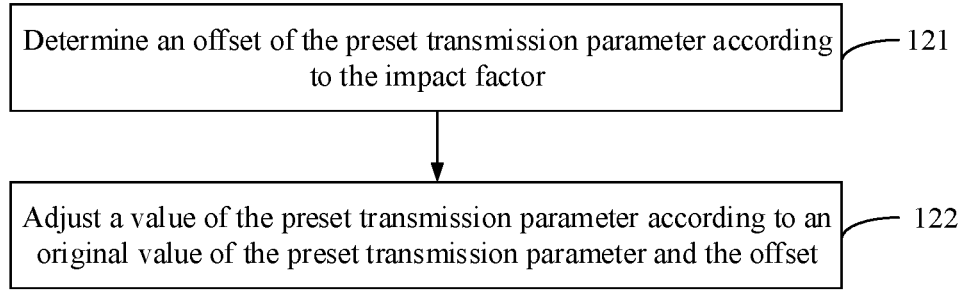
FIG. 5 is a flowchart illustrating another information transmission method according to an example of the present disclosure.

FIG. 5 is a flowchart illustrating another information transmission method according to an example. Step 12 may include the following steps.

At step 121, an offset of the preset transmission parameter is determined according to the impact factor.

At step 122, a value of the preset transmission parameter is adjusted according to an original value of the preset transmission parameter and the offset.

Assuming that the preset transmission parameter is a transmission power of the target UE, and if the target unit transmission resource is not affected, the base station determines an original value of the transmission power configured for the target UE as P0 according to related art. In the present disclosure, the base station may agree on a mapping relationship between impact ratio and power offset, such as a proportional relationship. When the determined impact ratio of the target unit transmission resource is larger, power offset ΔP determined by the base station is larger, so that the configured power of the target UE is finer adjusted. In this case, the target UE performs information transmission, according to the adjusted transmission power P0+ΔP, using the target unit transmission resource.

Configuration implementation 2 is mainly described in detail by taking the configuration of the transmission power as an example. Similarly, this configuration method is also applicable to the configuration of the modulation and coding scheme of the target unit transmission resource by the base station. When configuration implementation 2 described above is applicable for adjusting the MCS, the offset may be a reduction level of the modulation and coding scheme.

With configuration implementation 2 described above, the base station can also determine the offset of the preset transmission parameter according to the impact ratio of the target unit transmission resource, so as to fine adjust the preset transmission parameter such as the transmission power of the target UE according to the original value and the offset determined according to the related art, thereby improving the configuration accuracy of the preset transmission parameter for the target unit transmission resource, and further improving the utilization rate of the target unit transmission resource and the data transmission efficiency in the uplink and downlink switching scenarios.

It should be noted that configuration implementation 2 is mainly described in detail by taking the transmission power of the target UE on the target unit transmission resource as an example. Similarly, configuration implementation 2 is also applicable to the modulation and coding scheme of the target unit transmission resource by the base station, which is not described in detail.

At step 13, the target unit resource transmission is used to transmit information according to the transmission configuration information.

In the present disclosure, the implementation of step 13 may include the following two conditions:

Condition 1: the target unit transmission resource can be used to carry downlink data sent by the base station to the target UE.

In this case, the base station can use the target unit transmission resource to perform downlink information transmission according to the transmission configuration information.

Condition 2: the target unit transmission resource may also be scheduled as an uplink transmission resource, which is used to carry the uplink data sent by the target UE to the base station.

In this case, the base station sends the transmission configuration information to the target UE, so that the target UE performs uplink information transmission on the target unit transmission resource according to the transmission configuration information.

In summary, in the present disclosure, when a unit transmission resource is affected by the on/off transient period, the base station can determine the degree of impact of the unit transmission resource, determine whether to configure the unit transmission resource for data transmission. When determining that a target unit transmission resource is available for the data transmission according to a preset rule, according to the degree to which the target unit transmission resource is affected by the on/off transient period, transmission parameters such as a modulation and coding scheme and a corresponding transmission power of the UE can be configured. In this case, the reliability of the transmission information of the unit transmission resource can be ensured while effectively using the target unit transmission resource.

Figure 6:
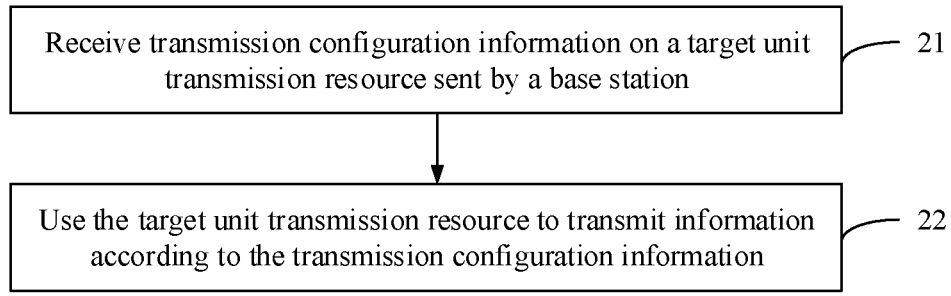
FIG. 6 is a flowchart illustrating another information transmission method according to an example of the present disclosure.

Correspondingly, the present disclosure also provides an information transmission method, which is applicable to a UE. Referring to FIG. 6, a flowchart illustrating an information transmission method according to an example, the method may include the following steps.

At step 21, transmission configuration information on a target unit transmission resource sent by a base station is received, where the target unit transmission resource is a unit transmission resource in which a time domain is affected by an on/off time mask.

Corresponding to step 13, taking UE1 as an example, UE1 can receive the transmission configuration information on the target unit transmission resource sent by the base station, where the target unit transmission resource is the unit transmission resource affected by the on/off time mask. The target unit transmission resource may be a symbol or two adjacent symbols.

At step 22, the target unit transmission resource is used to transmit information according to the transmission configuration information.

Corresponding to the two conditions of step 13, step 22 also includes two conditions:

Condition 1: UE1 obtains downlink transmission information carried by the target unit transmission resource according to the transmission configuration information.

Condition 2: corresponding to the condition where UE1 uses the target unit transmission resource for uplink information transmission.

Step 22 specifically includes: when the target unit transmission resource arrives, the UE1 uses the target unit transmission resource to perform uplink information transmission according to the transmission configuration information.

Figure 7:
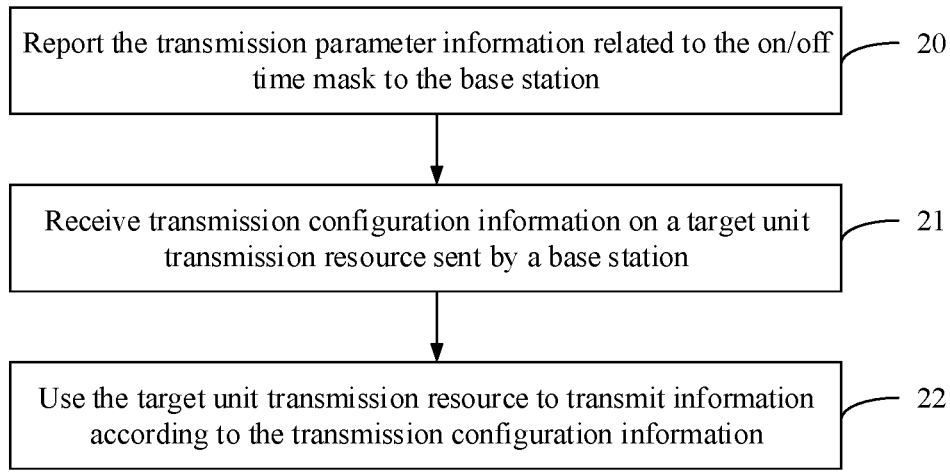
FIG. 7 is a flowchart illustrating another information transmission method according to an example of the present disclosure.

FIG. 7 is a flowchart illustrating another information transmission method according to an example. Before step 21, the method also includes the following step.

At step 20, transmission parameter information related to the on/off time mask is reported to the base station.

The transmission parameter information related to the on/off time mask may be: realization capability information for a radio frequency device in the terminal on the on/off time mask, that is, the on/off time mask realization capability information. For example, an on/off transient period of the radio frequency device in the terminal, or an on/off transient period determined by UE1; or, index information corresponding to the on/off transient period, which corresponds to the examples of the base station side shown in Table 2.

In an embodiment of this disclosure, for a trigger timing of the UE1 reporting the on/off time mask realization capability information to the base station, the UE1 may report the on/off time mask realization capability information to the base station when accessing a wireless network covered by the base station.

In another embodiment of the present disclosure, UE1 reports the on/off time mask realization capability information to the base station in response to receiving a reporting request sent by the base station.

In another embodiment of the present disclosure, the transmission parameter information related to the on/off time mask may also be an impact factor of the on/off time mask on the unit transmission resource, where the impact factor is determined by the terminal.

Figure 8:
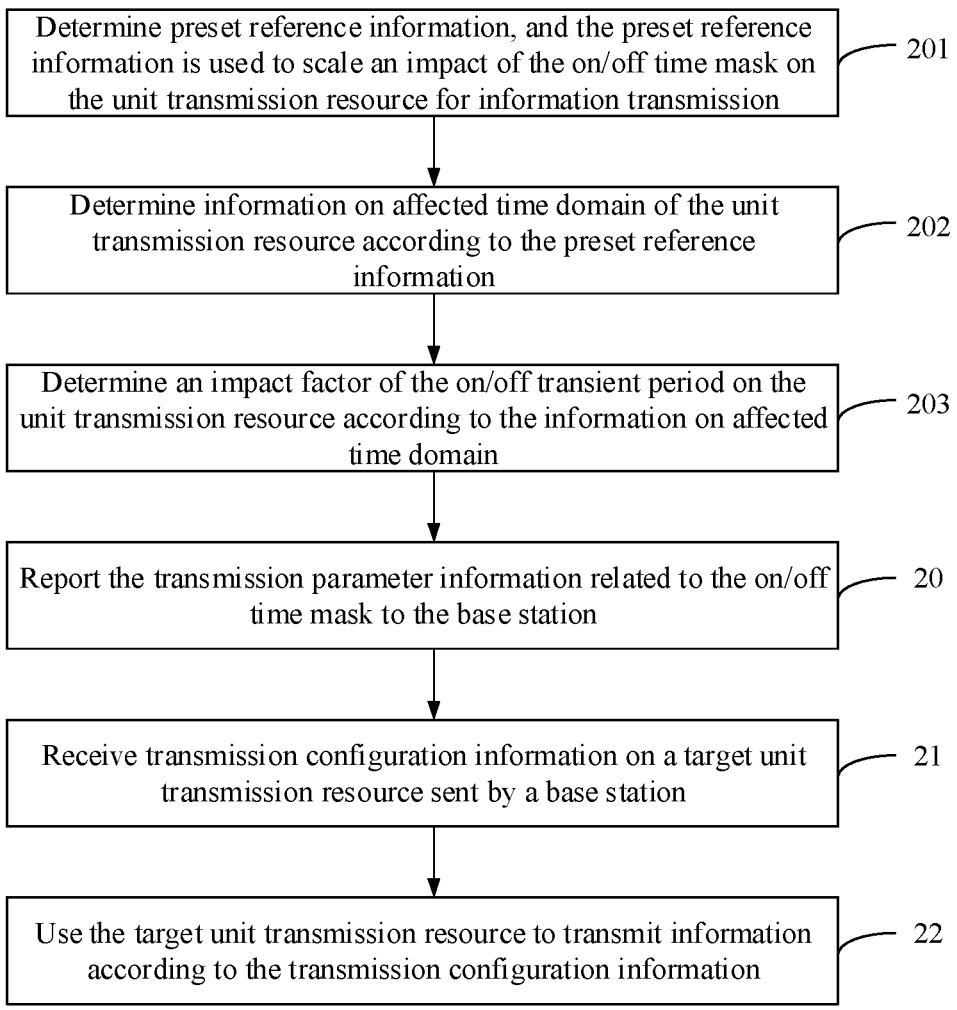
FIG. 8 is a flowchart illustrating another information transmission method according to an example of the present disclosure.

For that embodiment, FIG. 8 is a flowchart illustrating another information transmission method according to an example. Before step 20, the method also includes the following steps.

At step 201, preset reference information is determined, and the preset reference information is used to evaluate an impact of the on/off time mask on the unit transmission resource for information transmission.

Similar to the step of determining the impact factor of the on/off time mask on the unit transmission resource at the base station side, the terminal may also determine the impact factor based on the preset reference information, where the preset reference information includes: sub-carrier spacing used when transmitting information within a work frequency range; and the preset reference information may also include at least one of the following:

an on/off transient period of the terminal; or
a distribution ratio of the on/off transient period in two adjacent unit transmission resources.

At step 202, information on an affected time domain of the unit transmission resource is determined according to the preset reference information.

At step 203, an impact factor of the on/off transient period on the unit transmission resource is determined according to the information on the affected time domain.

In an embodiment of the present disclosure, the information on the affected time domain includes: a duration of the affected time domain in one unit transmission resource, where the affected time domain is a time domain affected by the on/off time mask.

Correspondingly, step 203 may specifically include: determining an impact ratio of the on/off transient period to the unit transmission resource according to a ratio of a duration of the affected time domain to a duration of the unit transmission resource.

The implementation of this embodiment is similar to the process of the base station determining the impact factor of the on/off time mask on the unit transmission resource in the example of FIG. 2.

In the embodiments of the present disclosure, the terminal may also calculate the impact factor of the on/off time mask on the unit transmission resource and report the impact factor to the base station, where the impact factor is calculated based on the on/off transient period of the radio frequency device of the terminal, the sub-carrier spacing used when communicating with the base station, and the distribution ratio when the on/off transient period is in two adjacent unit transmission resources. Thus, the base station can determine the transmission configuration information on the target unit transmission resource according to the impact factor, such as a modulation and coding scheme, a transmission power, and other information. Calculating the impact factor of the on/off time mask on the unit transmission resource by the terminal itself can reduce the calculation amount of the base station, and can also improve the accuracy of determining the impact factor.

For the foregoing method embodiments, for the sake of simple description, they are all expressed as combination of a series of actions, but one of ordinary skill in the art should understand that the present disclosure is not limited by the described sequence of actions, as some steps can be performed in other order or simultaneously according to the present disclosure.

Secondly, those skilled in the art should also understand that the embodiments described in the specification are all optional, and the involved actions and modules are not necessarily required by the present disclosure.

Corresponding to the foregoing method embodiments, the present disclosure further provides corresponding devices and corresponding terminals embodiments.

Figure 9:
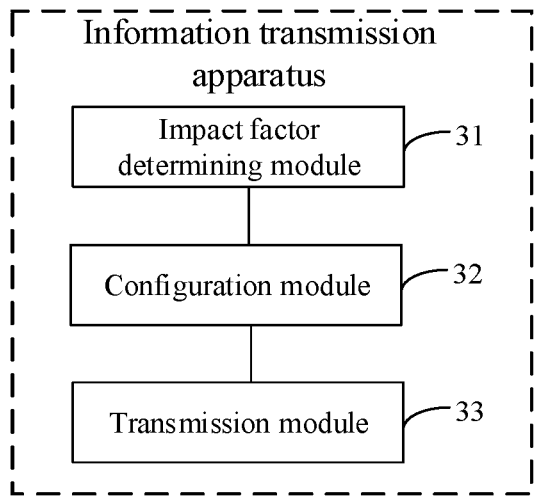
FIG. 9 is a block diagram illustrating an information transmission apparatus according to an example of the present disclosure.

FIG. 9 is a block diagram illustrating an information transmission apparatus according to an example, which is applicable to a base station, including:
- an impact factor determining module 31, configured to determine an impact factor of an on/off transient period on a unit transmission resource;

In an apparatus embodiment of the present disclosure, the impact factor determining module 31 can be configured to receive an impact factor of the on/off transient period on the unit transmission resource determined by the terminal.
- a configuration module 32, configured to determine transmission configuration information on a target unit transmission resource based on the impact factor, wherein the target unit transmission resource is the unit transmission resource where the on/off transient period is located;
- a transmission module 33, configured to use the target unit transmission resource for information transmission based on the transmission configuration information.

Figure 10:
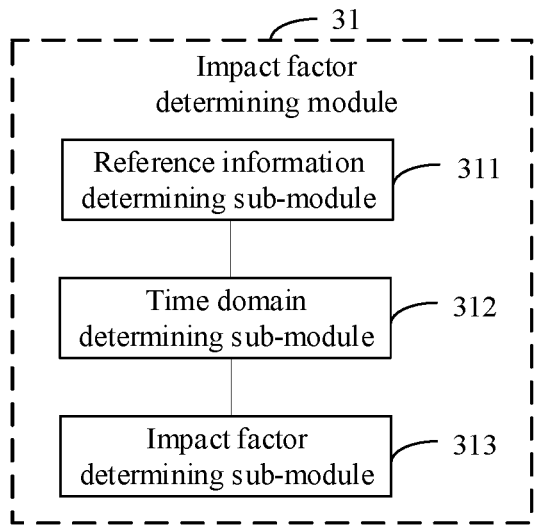
FIG. 10 is a block diagram illustrating another information transmission apparatus according to an example of the present disclosure.

FIG. 10 is a block diagram illustrating an information transmission apparatus according to an example, which is applicable to a base station, including:
- a reference information determining sub-module 311, configured to determine preset reference information, wherein the preset reference information is used to evaluate an impact of the on/off time mask on the unit transmission resource for information transmission;

In the present disclosure, the preset reference information includes: sub-carrier spacing used when transmitting information within a work frequency range, and further includes at least one of the following:
- an on/off transient period that the terminal needs to spend during an uplink and downlink switching;
- a distribution ratio of the on/off transient period in two adjacent unit transmission resources.
- a time domain determining sub-module 312, configured to determine information on an affected time domain of the unit transmission resource based on the preset reference information;
- an impact factor determining sub-module 313, configured to determine the impact factor of the on/off transient period on the unit transmission resource based on the information on the affected time domain.

In an apparatus embodiment of the present disclosure, the information on the affected time domain includes: a duration of the affected time domain in one unit transmission resource, and the affected time domain is a time domain affected by the on/off time mask;
the impact factor determining sub-module 313 can be configured to determine an impact ratio of the on/off transient period on the unit transmission resource base on a ratio of the duration of the affected time domain to a duration of the unit transmission resource.

In an apparatus embodiment of the present disclosure, the preset reference information includes: an on/off transient period of the terminal.

Figure 11:
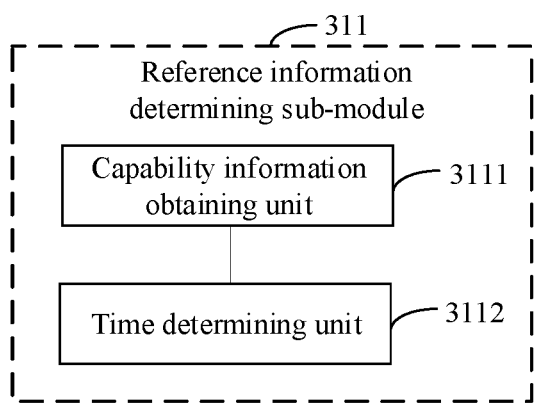
FIG. 11 is a block diagram illustrating another information transmission apparatus according to an example of the present disclosure.

FIG. 11 is a block diagram illustrating another information transmission apparatus according to an example, on the basis of the apparatus embodiment shown in FIG. 10, the reference information determining sub-module 311 may include:
- a capability information obtaining unit 3111, configured to obtain on/off time mask realization capability information reported by the terminal;
- a time determining unit 3112, configured to determine the on/off transient period of the terminal based on the on/off time mask realization capability information.

In an apparatus embodiment of the present disclosure, the configuration module 32 can be configured to configure a preset transmission parameter of the target unit transmission resource based on the impact factor, so as to obtain the transmission configuration information;
wherein the preset transmission parameter includes: a modulation and coding scheme and/or a transmission power.

Figure 12:
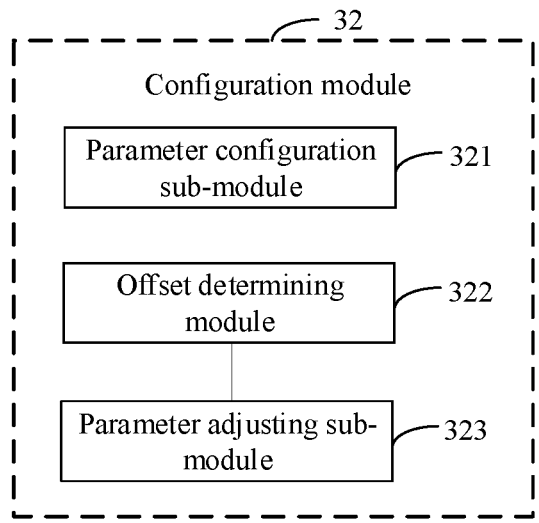
FIG. 12 is a block diagram illustrating another information transmission apparatus according to an example of the present disclosure.

FIG. 12 is a block diagram illustrating another information transmission apparatus according to an example, on the basis of the apparatus embodiment shown in FIG. 9, the configuration module 32 may include:
- a parameter configuration sub-module 321, configured to configure the preset transmission parameter for a target unit transmission resource that meets an availability condition based on a value of the preset transmission parameter; or
- an offset determining module 322, configured to determine an offset of the preset transmission parameter based on the impact factor;
- a parameter adjusting sub-module 323, configured to adjust the value of the preset transmission parameter based on an original value of the preset transmission parameter and the offset.

In an apparatus embodiment of the present disclosure, the parameter configuration sub-module 321 can be configured to determine a value of a preset transmission parameter corresponding to the impact factor by querying a preset transmission configuration list of preset transmission parameters based on the impact factor, wherein the preset transmission configuration list includes correspondences between impact factors and values of preset transmission parameters.

Figure 13:
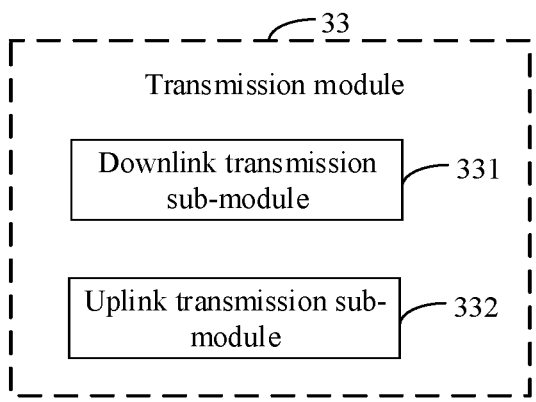
FIG. 13 is a block diagram illustrating another information transmission apparatus according to an example of the present disclosure.

FIG. 13 is a block diagram illustrating another information transmission apparatus according to an example, on the basis of the apparatus embodiment shown in FIG. 9, the transmission module 33 may include:
- a downlink transmission sub-module 331, configured to use the target unit transmission resource to perform downlink information transmission based on the transmission configuration information; or
- an uplink transmission sub-module 332, configured to send the transmission configuration information to the terminal for the terminal to use the target unit transmission resource to perform uplink information transmission based on the transmission configuration information.

Figure 14:
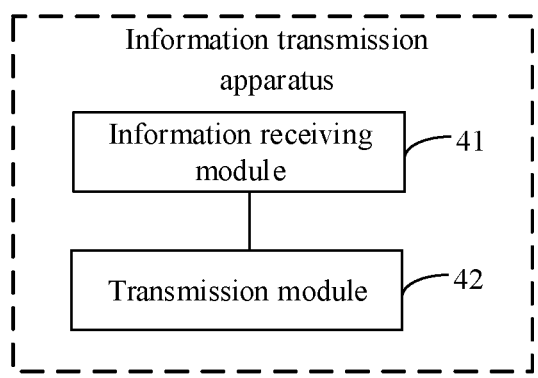
FIG. 14 is a block diagram illustrating an information transmission apparatus according to an example of the present disclosure.

Correspondingly, the present disclosure also provides an information transmission apparatus which is applicable to a terminal. FIG. 14 is a block diagram illustrating an information transmission apparatus according to an example, including:

an information receiving module 41, configured to receive transmission configuration information on a target unit transmission resource sent by a base station, wherein the target unit transmission resource is a unit transmission resource affected by an on/off time mask in a time domain;

a transmission module 42, configured to use the target unit transmission resource for information transmission based on the transmission configuration information.

Figure 15:
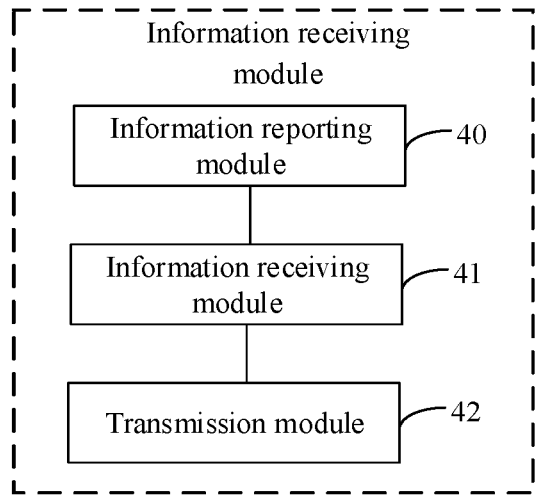
FIG. 15 is a block diagram illustrating another information transmission apparatus according to an example of the present disclosure.

FIG. 15 is a block diagram illustrating another information transmission apparatus according to an example, on the basis of the apparatus embodiment shown in FIG. 14, the apparatus further includes:

an information reporting module 40, configured to report transmission parameter information related to the on/off time mask to the base station.

wherein the transmission parameter information may include:

on/off time mask realization capability information on the terminal; or an impact factor of an on/off transient period on a unit transmission resource determined by the terminal.

In an apparatus embodiment of the present disclosure, the transmission parameter information includes: the impact factor of the on/off transient period on the unit transmission resource.

Figure 16:
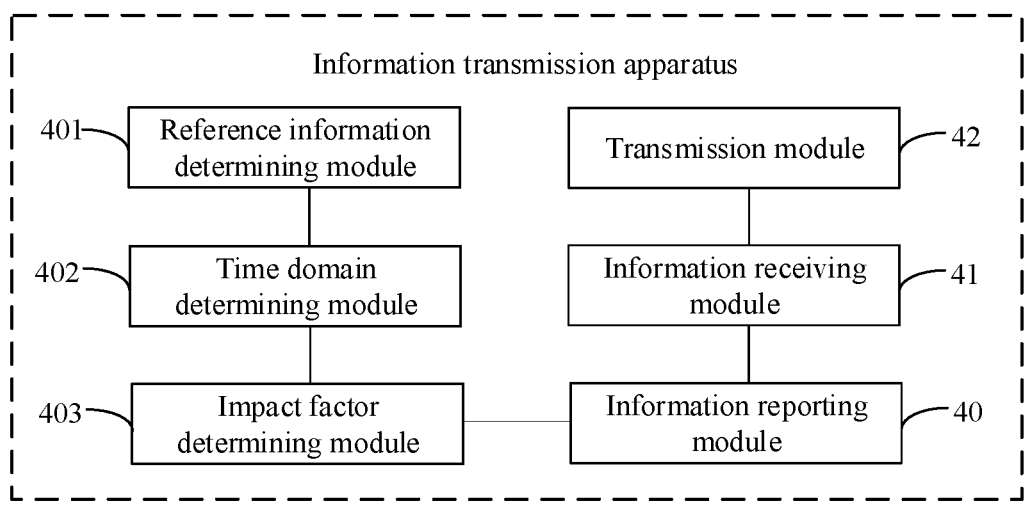
FIG. 16 is a block diagram illustrating another information transmission apparatus according to an example of the present disclosure.

FIG. 16 is a block diagram illustrating another information transmission apparatus according to an example, on the basis of the apparatus embodiment shown in FIG. 15, the apparatus further includes:

a reference information determining module 401, configured to determine preset reference information, wherein the preset reference information is used to evaluate an impact of the on/off time mask on the unit transmission resource for information transmission;

the preset reference information includes: sub-carrier spacing used when transmitting information within a work frequency range, and further includes at least one of the following:

an on/off transient period of the terminal;

a distribution ratio of the on/off transient period in two adjacent unit transmission resources.

a time domain determining module 402, configured to determine information on an affected time domain of the unit transmission resource based on the preset reference information;

an impact factor determining module 403, configured to determine the impact factor of the on/off transient period on the unit transmission resource based on the information on the affected time domain.

In an apparatus embodiment of the present disclosure, the information on the affected time domain includes: a duration of affected time domain in one unit transmission resource, and the affected time domain is a time domain affected by the on/off time mask;

the impact factor determining module 403 can be configured to determine an impact ratio of the on/off transient period on the unit transmission resource base on a ratio of the duration of the affected time domain to a duration of the unit transmission resource.

For the apparatus examples, since they basically correspond to the method examples, reference may be made to the partial description of the method examples. The apparatus examples described above are merely illustrative, where the units described as separate members may be or not be physically separated, and the members displayed as units may be or not be physical units, e.g., may be located in one place, or may be distributed to a plurality of network units. Part or all of the modules may be selected according to actual requirements to implement the objectives of the solutions in the examples. Those of ordinary skill in the art can understand and implement the present disclosure without any creative effort.

Correspondingly, on one hand, a base station is provided, including:

a processor; and a memory for storing instructions executed by the processor, wherein the processor is configured to:

determine an impact factor of an on/off transient period on a unit transmission resource;

determine transmission configuration information on a target unit transmission resource based on the impact factor, wherein the target unit transmission resource is the unit transmission resource where the on/off transient period is located;

use the target unit transmission resource for information transmission based on the transmission configuration information.

On the other hand, a terminal is provided, including:

a processor; and a memory for storing instructions executed by the processor, wherein the processor is configured to:

receive transmission configuration information on a target unit transmission resource sent by a base station, wherein the target unit transmission resource is a unit transmission resource affected by an on/off time mask in a time domain;

use the target unit transmission resource for information transmission based on the transmission configuration information.

Figure 17:
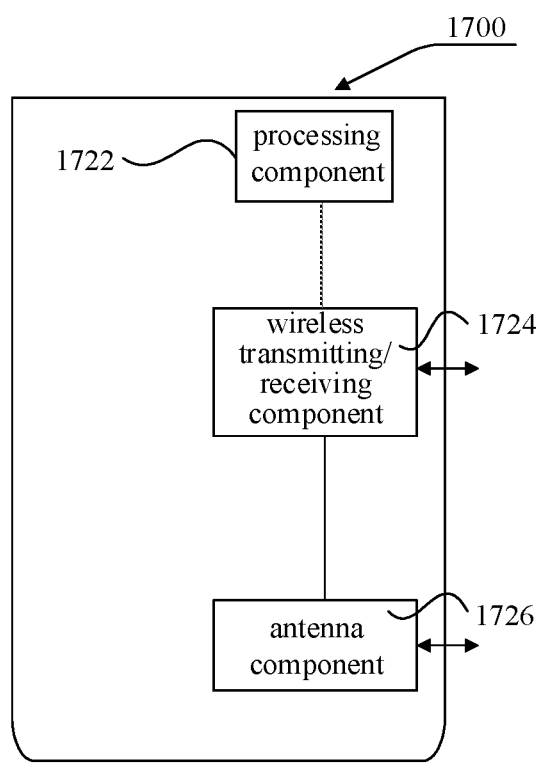
FIG. 17 is a schematic structural diagram of a base station according to an exemplary embodiment of the present disclosure.

As illustrated in FIG. 17, FIG. 17 is a schematic structural diagram of a base station 1700 according to an exemplary embodiment. Referring to FIG. 17, the base station 1700 includes a processing component 1722, a wireless transmitting/receiving component 1724, an antenna component 1726, and a signal processing part specific to a wireless interface. The processing component 1722 may further include one or more processors.

One of the processors in the processing component 1722 may be configured to:

determine an impact factor of an on/off transient period on a unit transmission resource;

determine transmission configuration information on a target unit transmission resource based on the impact factor, wherein the target unit transmission resource is the unit transmission resource where the on/off transient period is located;

use the target unit transmission resource for information transmission based on the transmission configuration information.

In an example, there is also provided a non-transitory computer readable storage medium storing computer instructions, where the computer instructions are executable by the processing component 1722 of the base station 1700 to perform any of the information transmission methods as shown in FIGS. 1 to 5. For example, the non-transitory computer-readable storage medium may be a ROM, a random access memory (RAM), a CD-ROM, a magnetic tape, a floppy disk, and an optical data storage device.

Figure 18:
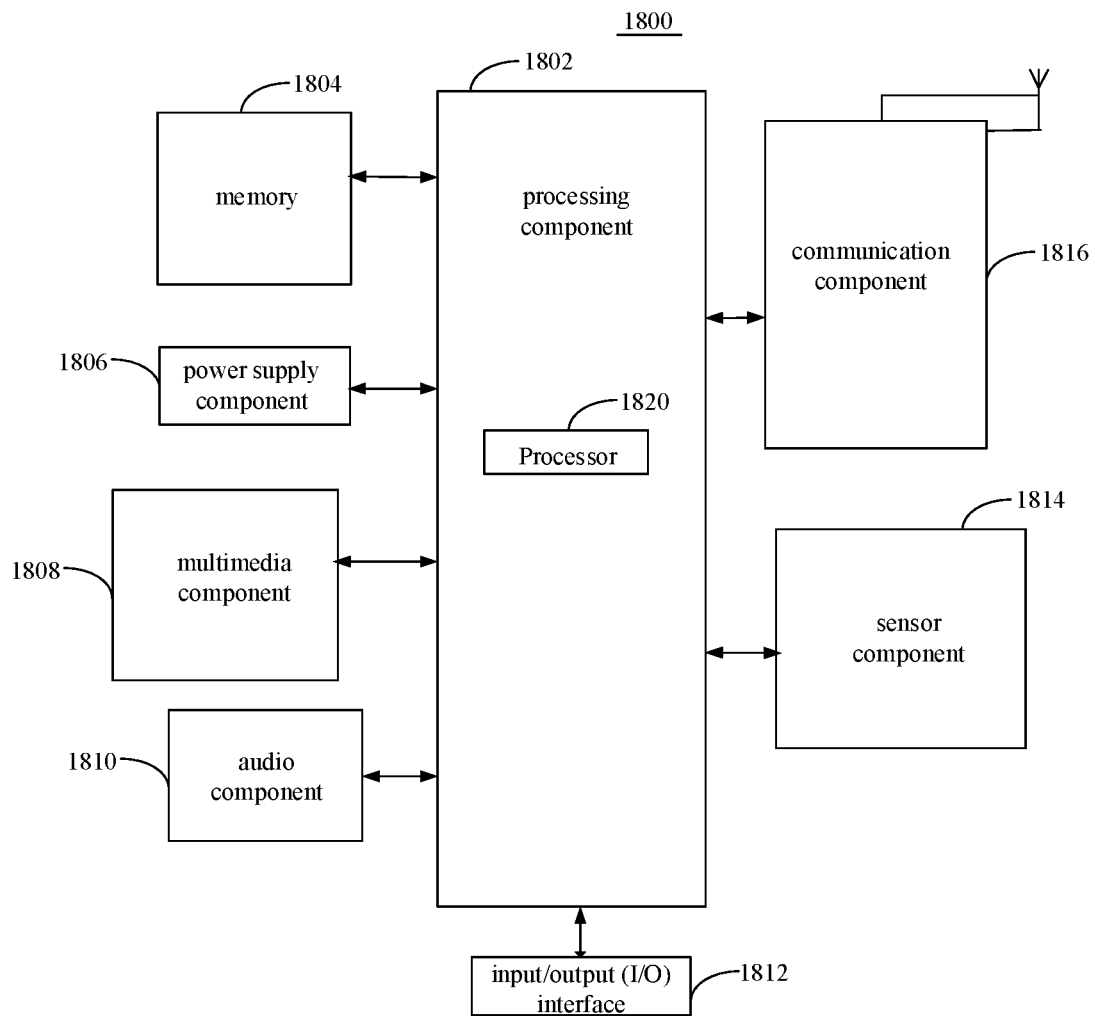
FIG. 18 is a schematic structural diagram of a terminal according to an exemplary embodiment of the present disclosure.

FIG. 18 is a schematic structural diagram of a terminal according to an example. For example, the terminal 1800 can be user equipment such as a mobile phone, a computer, a digital broadcasting terminal, a messaging device, a game console, a tablet device, a medical device, fitness equipment, a personal digital assistant, or a wearable device such as a smart watch, smart glasses, a smart wristband, smart sneakers, or the like.

As shown in FIG. 18, the terminal 1800 may include one or more of the following components: a processing component 1802, a memory 1804, a power supply component 1806, a multimedia component 1808, an audio component 1810, an input/output (I/O) interface 1812, a sensor component 1814, and a communication component 1816.

The processing component 1802 generally controls overall operations of the terminal 1800, such as operations associated with display, phone calls, data communications, camera operations, and recording operations. The processing component 1802 may include one or more processors 1820 to execute instructions to complete all or part of the steps of the above methods. Moreover, the processing component 1802 may include one or more modules to facilitate interaction between the processing component 1802 and other components. For example, the processing component 1802 may include a multimedia module to facilitate the interaction between the multimedia component 1808 and the processing component 1802.

The memory 1804 is configured to store various types of data to support operation at the terminal 1800. Examples of such data include instructions for any application or method operated on the terminal 1800, contact data, phonebook data, messages, pictures, videos, and so on. The memory 1804 may be implemented by any type of volatile or non-volatile storage device or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or an optical disk.

The power supply component 1806 supplies power for different components of the terminal 1800. The power supply component 1806 can include a power supply management system, one or more power supplies, and other components associated with generating, managing and distributing power for the terminal 1800.

The multimedia component 1808 includes a screen providing an output interface between the aforementioned terminal 1800 and the user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The above-mentioned touch sensor may not only sense the boundary of the touch or the sliding, but also detect duration and pressure related to the above-mentioned touch or sliding operation. In some examples, the multimedia component 1808 includes a front camera and/or a rear camera. When the apparatus 1800 is in an operation mode, such as a shooting mode or a video mode, the front camera and/or the rear camera may receive external multimedia data. Each of the front and rear cameras may be a fixed optical lens system or have a focal length and an optical zoom capability.

The audio component 1810 is configured to output and/or input audio signals. For example, the audio component 1810 includes a microphone (MIC). When the terminal 1800 is in an operating mode, such as a call mode, a record mode and a voice recognition mode, the microphone is to receive an external audio signal. The received audio signal may be further stored in the memory 1804 or transmitted via the communication component 1816. In some examples, the audio component 1810 also includes a loudspeaker for outputting an audio signal.

The I/O interface 1812 provides an interface between the processing component 1802 and a peripheral interface module which may be a keyboard, a click wheel, a button, or the like. These buttons may include, but are not limited to a home button, a volume button, a start button, and a lock button.

The sensor component 1814 includes one or more sensors to provide status assessments of various aspects for the terminal 1800. For example, the sensor component 1814 may detect the on/off status of the terminal 1800, and relative positioning of component, for example, the component is a display and a keypad of the terminal 1800. The sensor component 1814 may also detect a change in position of the terminal 1800 or a component of the terminal 1800, a presence or absence of the contact between a user and the terminal 1800, an orientation or an acceleration/deceleration of the terminal 1800, and a change in temperature of the terminal 1800. The sensor component 1814 may include a proximity sensor configured to detect the presence of nearby objects without any physical contact. The sensor component 1814 may also include a light sensor, such as a CMOS or CCD image sensor, for use in imaging applications. In some examples, the sensor component 1814 may also include an acceleration sensor, a gyro sensor, a magnetic sensor, a pressure sensor, or a temperature sensor.

The communication component 1816 is to facilitate wired or wireless communication between the terminal 1800 and other devices. The terminal 1800 can access a wireless network based on a communication standard, such as WiFi, 2G, 3G, 4G, LTE, or a combination thereof. In an example, the communication component 1816 receives a broadcast signal or broadcast related information from an external broadcast management system via a broadcast channel. In an exemplary embodiment, the communication component 1816 further includes a near field communication (NFC) module to facilitate short-range communication. For example, the NFC module may be implemented based on a radio frequency identification (RFID) technology, an infrared data association (IrDA) technology, an ultra wide band (UWB) technology, a Bluetooth (BT) technology, and other technologies.

In an example, the terminal 1800 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, or other electronic components for performing the method described above.

In an example, there is also provided a non-transitory computer readable storage medium including instructions, such as a memory 1804 including instructions, where the instructions are executable by the processor 1820 of the terminal 1800 to perform any of the information transmission methods as shown in FIGS. 6 to 8. For example, the non-transitory computer-readable storage medium may be a ROM, a random access memory (RAM), a CD-ROM, a magnetic tape, a floppy disk, and an optical data storage device.

The technical solutions provided by the examples of the present disclosure may include the following beneficial effects.

In the embodiments of the present disclosure, when a unit transmission resource is affected by the on/off transient period, the base station can determine the degree of impact of the unit transmission resource, determine whether to configure the unit transmission resource for data transmission. When determining that a target unit transmission resource is available according to a preset rule, according to the degree to which the target unit transmission resource is affected by the on/off transient period, transmission parameters such as modulation and coding scheme and corresponding transmission power of the UE can be configured. In this case, the reliability of the transmission information of the unit transmission resource can be ensured while effectively using the target unit transmission resource. In the application scenario of frequent switching between uplink and downlink, the utilization of resources can be improved, thereby increasing the data transmission rate.

Other embodiments of the present disclosure will be readily apparent to those skilled in the art after considering the specification and practicing the contents disclosed herein. The present application is intended to cover any variations, uses, or adaptations of the present disclosure, which follow the general principle of the present disclosure and include common knowledge or conventional technical means in the art that are not disclosed in the present disclosure. The specification and examples are to be regarded as illustrative only. The true scope and spirit of the present disclosure are pointed out by the following claims.

It is to be understood that the present disclosure is not limited to the precise structures that have described and shown in the drawings, and various modifications and changes can be made without departing from the scope thereof. The scope of the disclosure is to be limited only by the appended claims.

The invention claimed is:

1. An information transmission method, comprising:
   determining, by a base station, an impact factor of an on/off transient period on a unit transmission resource;
   determining, by the base station, transmission configuration information on a target unit transmission resource based on the impact factor, wherein the target unit transmission resource is the unit transmission resource where the on/off transient period is located; and
   using, by the base station, the target unit transmission resource for information transmission based on the transmission configuration information,
   wherein determining the transmission configuration information on the target unit transmission resource based on the impact factor comprises:
   obtaining the transmission configuration information by configuring a preset transmission parameter of the target unit transmission resource based on the impact factor;
   wherein the preset transmission parameter comprises at least one of following parameters: a modulation and coding scheme and a transmission power.

2. The method of claim 1, wherein determining the impact factor of the on/off transient period on the unit transmission resource comprises:
   determining preset reference information, wherein the preset reference information is used to evaluate an impact of an on/off time mask on the unit transmission resource for information transmission;
   determining information on an affected time domain of the unit transmission resource based on the preset reference information; and
   determining the impact factor of the on/off transient period on the unit transmission resource base on the information on the affected time domain.

3. The method of claim 2, wherein the preset reference information comprises: sub-carrier spacing used in response to transmitting information within a work frequency range, and further comprises at least one of following parameters:
   an on/off transient period that a terminal is to spend during uplink and downlink switching; or
   a distribution ratio of the on/off transient period in two adjacent unit transmission resources.

4. The method of claim 3, wherein the preset reference information comprises:
   the on/off transient period of the terminal; and
   wherein determining the preset reference information comprises:
   obtaining on/off time mask realization capability information reported by the terminal; and
   determining the on/off transient period of the terminal based on the on/off time mask realization capability information.

5. The method of claim 2, wherein the information on the affected time domain comprises: a duration of the affected time domain in one unit transmission resource, and the affected time domain is a time domain affected by the on/off time mask; and
   wherein determining the impact factor of the on/off transient period on the unit transmission resource base on the information on the affected time domain comprises:
   determining the impact ratio of the on/off transient period on the unit transmission resource base on a ratio of the duration of the affected time domain to a duration of the unit transmission resource.

6. The method of claim 1, wherein determining the impact factor of the on/off transient period on the unit transmission resource comprises:
   receiving the impact factor of the on/off transient period on the unit transmission resource determined by a terminal.

7. The method of claim 1, wherein configuring the preset transmission parameter of the target unit transmission resource based on the impact factor comprises:
   configuring the preset transmission parameter for a target unit transmission resource that meets an availability condition based on a value of the preset transmission parameter; or
   determining an offset of the preset transmission parameter based on the impact factor, and adjusting the value of the preset transmission parameter based on an original value of the preset transmission parameter and the offset.

8. The method of claim 7, wherein configuring the preset transmission parameter for the target unit transmission resource that meets the availability condition based on the value of the preset transmission parameter comprises:
   determining the value of the preset transmission parameter corresponding to the impact factor by querying a preset transmission configuration list of preset transmission parameters based on the impact factor; wherein the preset transmission configuration list comprises a correspondence between the impact factor and a value of the preset transmission parameter.

9. The method of claim 1, wherein using the target unit transmission resource for the information transmission based on the transmission configuration information comprises:

using the target unit transmission resource to perform downlink information transmission based on the transmission configuration information; or sending the transmission configuration information to a terminal such that the terminal uses the target unit transmission resource to perform uplink information transmission based on the transmission configuration information.

10. An information transmission method, comprising:

receiving, by a terminal, transmission configuration information on a target unit transmission resource sent by a base station, wherein the target unit transmission resource is a unit transmission resource affected by an on/off time mask in a time domain; and using, by the terminal, the target unit transmission resource for information transmission based on the transmission configuration information, wherein the transmission configuration information is obtained by configuring a preset transmission parameter of the target unit transmission resource based on an impact factor of an on/off transient period on a unit transmission resource, wherein the preset transmission parameter comprises at least one of following parameters: a modulation and coding scheme and a transmission power.

11. The method of claim 10, further comprises:

reporting transmission parameter information related to the on/off time mask to the base station.

12. The method of claim 11, wherein the transmission parameter information comprises:

on/off time mask realization capability information on the terminal; or the impact factor of the on/off transient period on the unit transmission resource determined by the terminal.

13. The method of claim 12, wherein the transmission parameter information comprises: the impact factor of the on/off transient period on the unit transmission resource; and the method further comprises:

determining preset reference information, wherein the preset reference information is used to evaluate an impact of the on/off time mask on the unit transmission resource for information transmission;

determining information on an affected time domain of the unit transmission resource based on the preset reference information; and determining the impact factor of the on/off transient period on the unit transmission resource base on the information on the affected time domain.

14. The method of claim 13, wherein the preset reference information comprises: sub-carrier spacing used in response to transmitting information within a work frequency range, and further comprises at least one of following parameters:

the on/off transient period of the terminal; and a distribution ratio of the on/off transient period in two adjacent unit transmission resources.

15. The method of claim 13, wherein the information on the affected time domain comprises: a duration of the affected time domain in one unit transmission resource, and the affected time domain is a time domain affected by the on/off time mask; and wherein determining the impact factor of the on/off transient period on the unit transmission resource base on the information on the affected time domain comprises:

determining the impact ratio of the on/off transient period on the unit transmission resource base on a ratio of the duration of the affected time domain to a duration of the unit transmission resource.

16. A non-transitory computer-readable storage medium having computer instructions stored thereon, wherein the computer instructions, when executed by a processor, perform steps of the method according to claim 1.

17. A non-transitory computer-readable storage medium having computer instructions stored thereon, wherein the computer instructions, when executed by a processor, perform steps of the method according to claim 10.

18. A base station, comprising:

a processor; and a memory for storing instructions executed by the processor, wherein the processor is configured to:

determine an impact factor of an on/off transient period on a unit transmission resource;

determine transmission configuration information on a target unit transmission resource based on the impact factor, wherein the target unit transmission resource is the unit transmission resource where the on/off transient period is located; and use the target unit transmission resource for information transmission based on the transmission configuration information, wherein the processor is further configured to: obtain the transmission configuration information by configuring a preset transmission parameter of the target unit transmission resource based on the impact factor;

wherein the preset transmission parameter comprises at least one of following parameters: a modulation and coding scheme and a transmission power.

19. A terminal, comprising:

a processor; and a memory for storing instructions executed by the processor, wherein the processor is configured to perform the method according to claim 10.

* * * * *